United States Patent

[11] 3,600,700

[72] Inventor Yoshio Matsuo
Tokyo, Japan

[21] Appl. No. 831,012
[22] Filed June 6, 1969
[45] Patented Aug. 17, 1971
[73] Assignee Nippon Electric Company, Limited
Tokyo, Japan
[32] Priority June 12, 1968
[33] Japan
[31] 43/40728

[54] CIRCUIT FOR PHASE LOCKING AN OSCILLATOR TO A SIGNAL MODULATED IN N-PHASES
4 Claims, 2 Drawing Figs.

[52] U.S. Cl. .......... 331/12, 329/122, 329/124, 331/17, 331/25, 340/170
[51] Int. Cl. .......... H03b 3/04
[50] Field of Search .......... 331/1 A, 11, 12, 18, 25, 17; 329/122, 124; 328/155; 340/170

[56] References Cited
UNITED STATES PATENTS
3,336,534 8/1967 Gluth .......... 331/12
3,456,196 7/1969 Schneider .......... 331/12 X

*Primary Examiner*—Roy Lake
*Assistant Examiner*—Siegfried H. Grimm
*Attorney*—Sandoe, Hopgood and Calimafde

ABSTRACT: A phase synchronizing circuit includes a voltage-controlled oscillator wherein the oscillatory frequency changes around a center $f_0$ by control against a digital input signal being modulated in $n$-phases of which the carrier frequency is $f_0$; $n$-phase detectors; $n$-comparators; a logic circuit having $n$-input terminals which performs an "exclusive or" or "negation of exclusive or" operation; and, a low-pass filter. The input signal, an output of the oscillator and the $n$-phase detectors are connected so as to detect $$\frac{2\pi}{n}K\,(K=1, 2, \ldots n)$$

phase components in the input signal wherein an output of the oscillator is the reference phase. The outputs of each detector are applied to the $n$-comparators respectively, the outputs of the $n$-comparators to $n$-input terminals of the logic circuit, and the output of the logic circuit is connected so as to control the oscillatory frequency of the voltage-controlled oscillator through the low-pass filter.

INVENTOR
Yoshio Matsuo by
Sandoe, Hopgood & Calimafde
ATTORNEYS.

CIRCUIT FOR PHASE LOCKING AN OSCILLATOR TO A SIGNAL MODULATED IN N-PHASES

BACKGROUND OF THE INVENTION

The present invention relates to a phase synchronizing circuit for obtaining a reference phase signal to be employed for coherent detection in demodulating pulse code modulation signals and, in particular, for use in a phase modulation transmission system.

There are roughly two classifications of methods for demodulating in digital phase modulation transmission systems. These are: differential detection and coherent detection. A coherent detection system is superior to a differential detection system with respect to the effect of noise, but the former system has the disadvantage that it requires a reference phase signal for demodulation and that the necessary circuitry is complicated. Furthermore, the reference phase signal must be very exact. Hence, sever precision is required as to each element of the circuit for obtaining the reference phase signal. Consequently, particularly in high speed code transmissions, it is not easy to satisfactorily perform coherent detection.

One method of making a reference phase signal for coherent detection of a phase modulated wave of two phases suggests the use of a voltage-controlled oscillator as a reference whereby in-phase and perpendicular components of an input signal are detected and the analog product of both detected outputs is formed by a multiplication circuit; the voltage-controlled oscillator being controlled by the output. However, in this case, a precise multiplication circuit which operates at high speed and at a low input level is required, and it is difficult to realize a multiplication circuit of such performance.

OBJECTS OF THE INVENTION

It is an object of the present invention to provide a phase synchronizing circuit to obtain an exact reference phase signal for coherent detection.

It is another object of the present invention to provide a phase synchronizing circuit of simple circuit configuration, good performance, and which operates advantageously in high speed code transmissions.

BRIEF SUMMARY OF THE INVENTION

The inventive phase synchronizing circuit comprises: a voltage-controlled oscillator wherein the oscillatory frequency changes around a center $f_o$ by control against a digital input signal being modulated in $n$ phases of which the carrier of frequency is $f_o$; $n$-phase detectors; $n$-comparators; a logic circuit having $n$-input terminals which performs an "exclusive or" or "negation of exclusive or" operation; and, a low-pass filter. The input signal, an output of the oscillator and the $n$-phase detectors are connected so as to detect $$\frac{2\pi}{n}K(K=1, 2, \ldots n)$$

phase components in the input signal wherein an output of the oscillator is the reference phase. The outputs of each detector are applied to the $n$-phase respectively, the outputs of the $n$-comparators to $n$-input terminals of the logic circuit, and the output of the logic circuit is connected so as to control the oscillatory frequency of the voltage-controlled oscillator through the low-pass filter.

The above mentioned and other features and objects of this invention and the manner of attaining them will become more apparent and the invention itself will best be understood by reference to the following description of an embodiment of the invention taken in conjunction with the accompanying drawings, the description of which follows:

FIG. 1 is a block diagram showing an embodiment of the present invention; and

FIGS. 2($a$)—2($e$) are characteristic signal diagrams at the input and output of select elements in FIG. 1 for explaining the operation thereof.

DETAILED DESCRIPTION OF THE INVENTION

Figure 1:
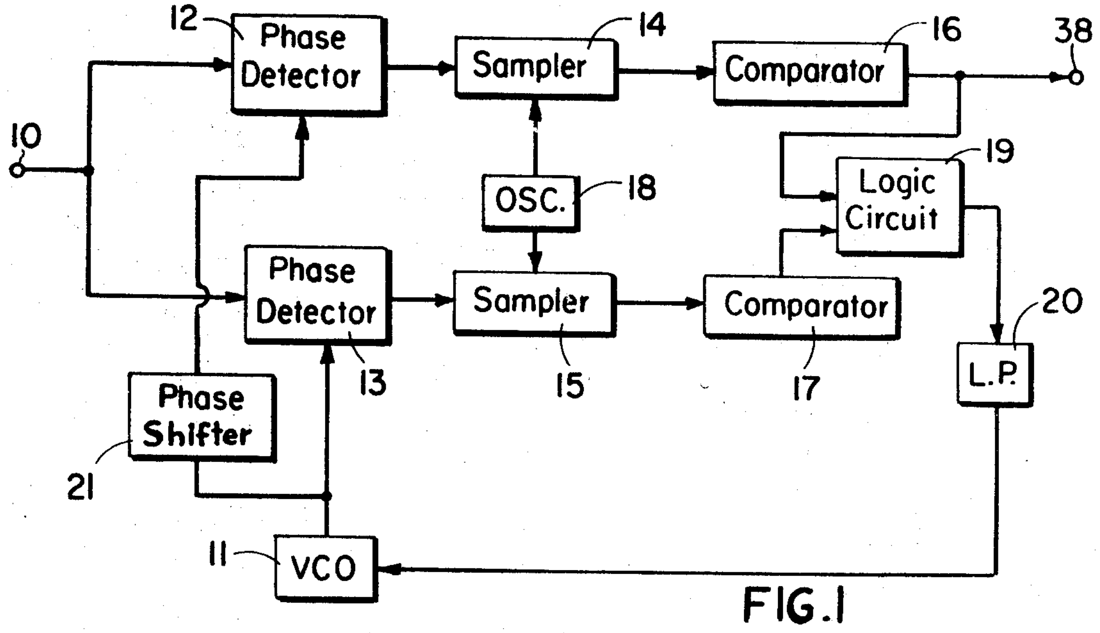

Referring now to FIG. 1, an input signal is applied to terminal 10 and a quadrature component relative to an output of an oscillator 11, which is a voltage-controlled oscillator, the frequency of which is variable around carrier frequency $f_o$, is detected by a phase detector 12, and an in-phase component is detected by a phase detector 13. Each detected output is sampled at a clock period by sampler 14 and 15, under control of clock signal oscillator 18 which is synchronous with the clock frequency of the input signal, and converted to a binary digital signal by comparators 16 and 17. These comparators compare and discriminate whether an input signal is larger or smaller than a reference level and generate corresponding binary digital signals. The samplers and comparators can be separate or made in one unit by utilizing a tunnel diode pair. "Exclusive or" operation is performed against the outputs of both comparators 16 and 17 by a logic circuit 19, and the high frequency component of the output is eliminated by a low-pass filter 20. The output is then fed back to the control terminal of voltage-controlled oscillator 11. Thus, the voltage of voltage-controlled oscillator 11 is controlled electrically and the oscillatory frequency changes up and down around the center $f_o$.

Figure 2:
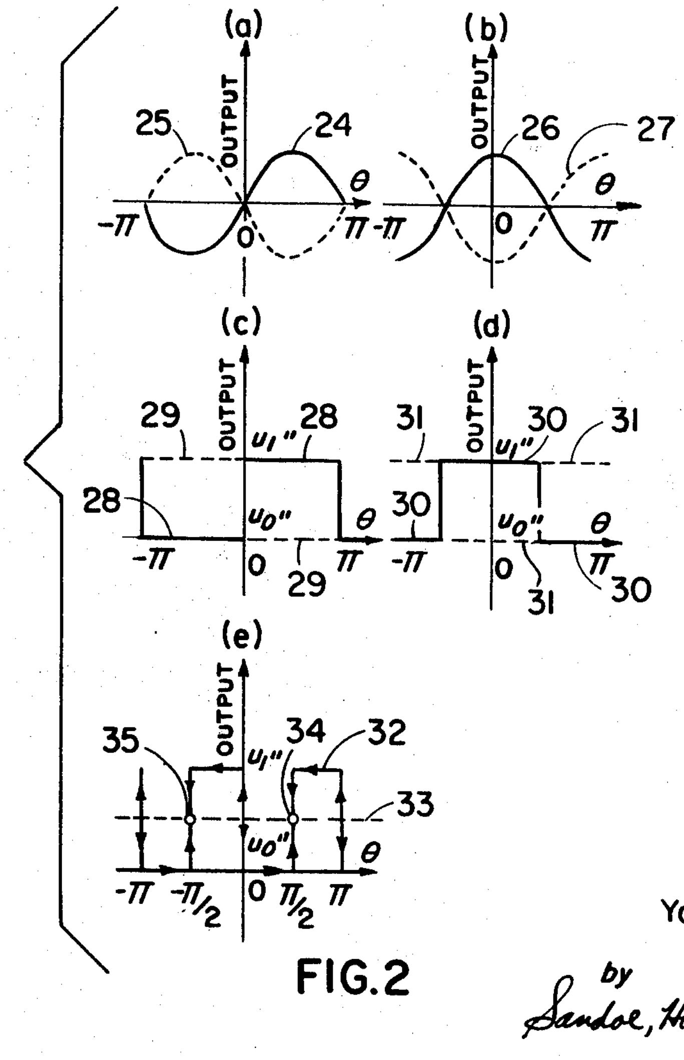

Referring to FIG. 2, the operation of a circuit shown in FIG. 1 will be described. Assuming that an input signal $V_s=A\cos2\pi f_ot$ ($t$ is time). $A$ can be +1 or −1 according to the transmitted code, and it will be assumed that the case of $A=+1$ is 0–phase and that the case of $A=-1$ is $\pi$–phase. Assuming an output $V_o$ of a voltage-controlled oscillator 11 as follows, $V_o=\cos(2\pi f_o t+\theta)$, where $\theta$ is the phase difference between an input signal and an oscillatory output, and must be constant irrespective of phase 0 or $\pi$ of an input signal in order to utilize the $V_o$ as a reference signal in coherent detection. If $V_s$ and $V_o$ are denoted by such equations, an output of a detector 12 is proportional to the low frequency component of $A\cos2\pi f_ot\ x\ \cos(2\pi f_ot+\theta-\pi/2)$ or $A\sin\theta$ because $V_o$ is shifted by $\pi/2$ through a phase shifter 21 and applied to input side of detector 12. The relationship between the output of the detector 12 and $\theta$ is shown in FIG. 2($a$). In the figure, the full line 24 shows the case where the input signal is 0–phase and the broken line 25 shows the case where the input signal is $\pi$–phase. The output of detector 13 is proportional to the low frequency component of $A\cos2\pi f_ot\ x\ \cos(2\pi f_ot+\theta)$ or $A\cos\theta$. The relationship between the output of the detector 13 and $\theta$ is shown in FIG. 2($b$) and the full line 26 shows the case where the input signal is 0–phase and the broken line 27 shows the case where an input signal is $\pi$–phase. The outputs of these detectors are converted to binary digital signals by the comparator which has a zero reference level. The detector outputs are "1" if the output of the detector is positive and "0" if it is negative. FIG. 2($c$) shows the relationship between the output of the comparator 16 and $\theta$; and, FIG. 2($d$) shows the relationship between the output of comparator 17 and $\theta$. The full lines 28 and 30 show the case where the input signal is O–phase and the broken lines 29 and 31 show the case where the input signal is $\pi$–phase.

The outputs of the two comparators are applied to the logic circuit 19 so that the following outputs from this circuit are obtained by the output of each comparator.

| | | | | |
|---|---|---|---|---|
| The output of one comparator | 0 | 0 | 1 | 1 |
| The output of the other comparator | 0 | 1 | 0 | 1 |
| The output of the logic circuit | 0 | 1 | 1 | 0 |

As shown in FIG. 2($e$), the relationship between the output of the logic circuit and $\theta$ is constant in any case of 0–phase and $\pi$–phase as shown by the full line 32. Consequently, if the frequency of the voltage-controlled oscillator is controlled so as to make $\theta$ decrease when the output of the logic circuit 19 (shown as the full line 32) is larger than the constant voltage (shown as the broken line 33), and is controlled so as to make $\theta$ increase when the said output is smaller than said constant voltage, then $\theta$ changes along the direction of the arrow on the full line 32 and is in a stable state at the points 34 and 35. The steady phases of $\theta$ are $\pm\pi/2$. Consequently, it may be seen that it is possible to obtain a reference phase signal to perform coherent detection for phase modulated wave of two phases. In this case, $\theta$ is either of the said values according to the initial condition in synchronization.

In the phase synchronizing circuit, as is apparent from FIG. 2(*e*), if $\theta$ deviates from the steady phase slightly, the phase $\theta$ is controlled precisely because the control voltage applied to the voltage-controlled oscillator undergoes a large change, and hence, the recovery from the asynchronous state to the synchronous state is speedy. Furthermore, as is apparent from the output at the $\theta=\pm\pi/2$ in FIG. 2(*c*), it is possible to obtain the coherently detected output signal from the output terminal 38 because the output of the comparator 16 becomes "0" or "1" according to the phase of the input signal. In the described embodiment, it is also possible to obtain the coherently detected output from the terminal 38. In this case, if the coherently detected output sampled at the clock rate is not required, the sampler can be omitted.

Apparently, it is not always necessary for the frequency of the clock frequency oscillator 18 to coincide with the clock frequency of the input signal. For convenience of explanation, the present invention has been described with respect to the demodulation of phase modulation of two phases, but the invention is not so limited. A similar construction applies to any $n$-phase system.

What I claim is:

1. A phase synchronizing circuit comprising:

a voltage-controlled oscillator whose frequency may be varied around the center frequency $f_o$ with respect to a digital input signal modulated in $n$-phases and a carrier frequency $f_o$;

$n$-phase detectors coupled to said oscillator to detect $$\frac{2\pi}{n}(K=1, 2, \ldots n)$$

phase components of the input signal;

$n$-comparators coupled respectively to said detectors;

a logic circuit having $n$-input terminals respectively coupled to said comparators for determining "exclusive or" or "-negation of exclusive or" function; and a low-pass filter coupled between said logic circuit and said voltage-controlled oscillator for controlling the oscillatory frequency of said oscillator.

2. A phase synchronizing circuit claimed in claim 1, further comprising a clock pulse source; and $n$-samplers receiving clock pulses from said clock pulse source, and coupled, respectively, between said $n$-comparators and $n$-detectors.

3. The phase synchronizing circuit claimed in claim 1, in which $n$=2, and further comprising a phase shifter of $\pi/2$ coupled between said oscillator and one of said phase detectors.

4. The phase synchronizing circuit claimed in claim 2, in which $n$=2, and further comprising a phase shifter of $\pi/2$ coupled between said oscillator and one of said phase detectors.